July 21, 1931.

L. HUFFMAN

Re. 18,134

MANIFOLDING BOOK

Original Filed Feb. 21, 1925

Inventor
L. Huffman
By J. Edw. Maybee
ATTY.

Reissued July 21, 1931 Re. 18,134

UNITED STATES PATENT OFFICE

LOUIS HUFFMAN, OF TORONTO, ONTARIO, CANADA, ASSIGNOR TO TORONTO TYPE FOUNDRY COMPANY, LIMITED, OF TORONTO, CANADA

MANIFOLDING BOOK

Original No. 1,730,148, dated October 1, 1929, Serial No. 10,784, filed February 21, 1925. Application for reissue filed May 19, 1931. Serial No. 538,529.

This invention relates to that type of manifolding book in which a separate carbon sheet is employed with each set of duplicates and originals, the carbon sheet being formed of a very thin paper very lightly coated, a book being thus obtained possessing many of the advantages of both the "carbon leaf" and the "automatic" books.

For some purposes it is an objection that the carbon sheets after use must be torn out or else remain attached to the stub of the book. In either case there is a possibility of the user soiling his hands with the carbon coating of the carbon sheets or merchandise being soiled by the exposed sheets.

For many purposes it is also desirable to have the sets of record leaves comprising an original and duplicate removable as units from the book with a transfer sheet secured thereto so that additional entries on the original may be made and duplicated after the removal of the unit from the book without any trouble of placing or replacing a carbon sheet.

My object then is to devise a manifolding book in which the coated surfaces of the carbon sheets are at all times so protected that neither the user's hands nor merchandise nor papers can come into contact with them in the ordinary use of the book.

A further object is to provide a book comprising a plurality of manifold units each detachable as a whole from the book with the record leaves and carbon sheet retained in their original positions connected to one another.

I attain my first object by forming the duplicates of a thin translucent paper and securing behind each duplicate sheet a sheet of carbon paper coated only on the side next the duplicate sheet. The two sheets are so connected that the carbon sheets turn with the duplicate sheets in handling of the book. When it is desired that duplicates shall be removable the duplicate sheet and the carbon sheet are so connected that the one covers the other both when in the book and after removal.

My second object is attained by connecting the original and duplicate record sheets and binding the stubs of the duplicates in the book. A carbon sheet is united by one margin to the back of one of the said record sheets adjacent the juncture of the said sheets and, preferably also at its other end to the same record sheet adjacent its stub end.

Figure 1:
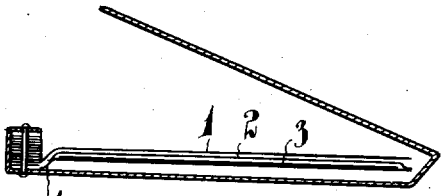
Figure 4:
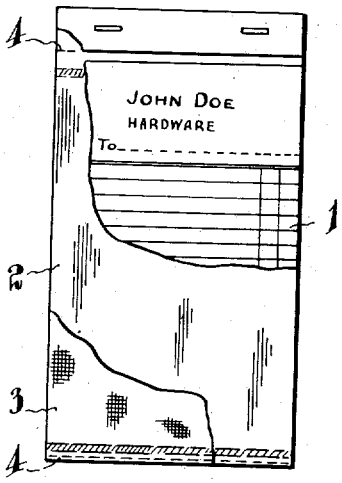
Figure 2:
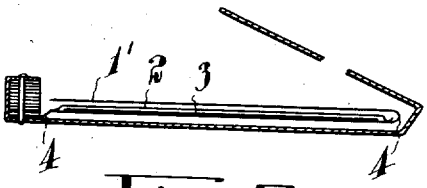
Figure 3:
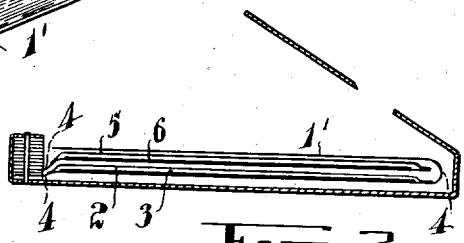

The invention is hereinafter more specifically described and is illustrated in the accompanying drawings in which Fig. 1 is a side elevation of part of what is known as a single sheet manifolding book constructed in accordance with my invention;

Fig. 2 a similar view illustrating the application of my invention to that type of book in which the original sheet is connected with the outer end of a duplicate;

Fig. 3 a similar view illustrating the application of my invention to a triplicate book;

Fig. 4 a plan view, partly broken away, of the parts shown in Fig. 2; and

Figure 5:
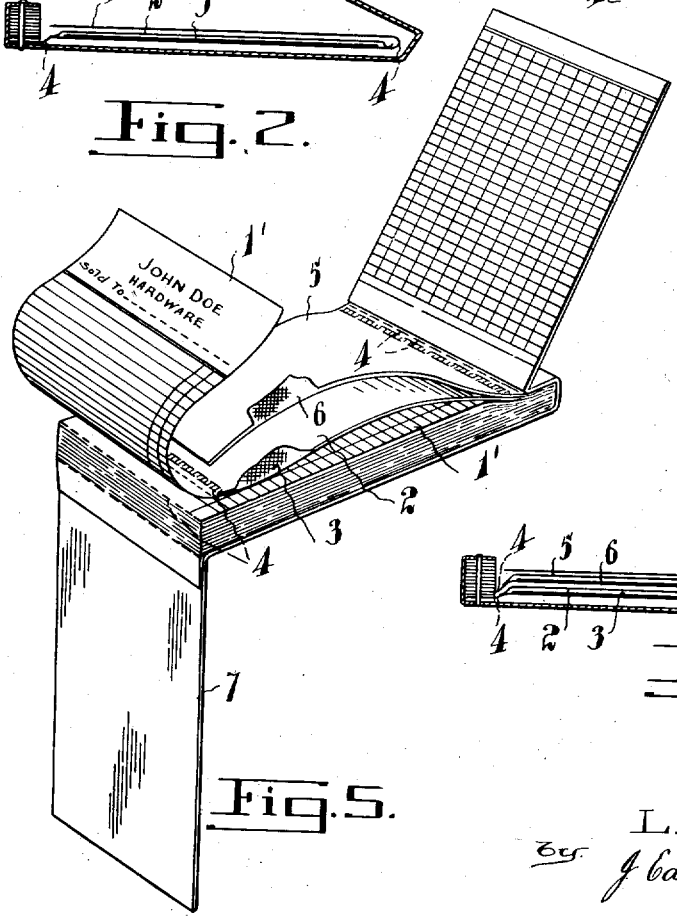

Fig. 5 a perspective view of a triplicate book constructed in accordance with my invention.

In the drawings like numerals of reference indicate corresponding parts in the different figures.

In the form of book shown in Fig. 1, the original sheets or forms 1 are entirely separate from the duplicates 2, each being bound in with the stub of the book. The original sheet may be of any grade of paper commonly employed for this purpose, but the duplicate is formed of a translucent paper, the degree of translucency being sufficient to permit carbon compound transferred to the back of the sheet showing distinctly through at the front.

Behind the duplicate is secured a carbon sheet 3, the sheet being preferably formed of very thin paper and very thinly coated with carbon compound. This carbon sheet is gummed or otherwise secured behind the duplicate so as to turn therewith in the handling of the book.

Preferably the outer ends of the duplicate and carbon sheet are gummed together. The other ends may be bound in the book, but if for any reason it is desired that the duplicates shall be removable from the book, it is necessary to gum the upper ends of the duplicates and carbon sheets together and preferably to provide a line of weakness 4 to facilitate the tearing of the duplicate from the stub and to ensure that the tearing will take place above the connection between the carbon sheet and the duplicate, so that the two are removed together as a unit.

In Fig. 2 is illustrated part of a book of the type in which the original 1 is connected with the outer end of the duplicate and is turned in over the duplicate. In this construction the carbon sheet is shown as gummed to the duplicate sheet adjacent the juncture of the latter with the original and also at its stub end. In this form, while the carbon sheet, the duplicate and the original may be all separate pieces connected together at their outer ends, it is also possible to make the original, and carbon sheet integral, the two being cut from a web of paper a part of which is coated with carbon compound. In this form also the duplicate and carbon sheet may be connected with the stub of the book in the manner set forth in describing the construction of the form shown in Fig. 1.

In Figs. 3 and 5 I illustrate the complete embodiment of my invention in a triplicate book. In this form the original 1 is connected with the outer ends of a duplicate 2 and a carbon sheet 3. The inner end of the duplicate and carbon sheet may be connected in the book in the manner hereinbefore described. In addition I show a second translucent sheet 5 behind which is secured a carbon sheet 6 also in the manner hereinbefore described. When the book is in use the original is thrown over to lie on top of the sheet 5, which, with its carbon sheet 6, overlies the duplicate 2 and its carbon sheet 3.

As a matter of practice the sheet 2 of a triplicate book is commonly known as the triplicate, while the sheet 5 is known as the duplicate. So also it is usual to so arrange the book that the sheets 5 remain bound in the book, while the sheets 2 are usually torn out. In this form of book it will be usual therefore to provide a line of weakness along which the duplicates 2 may be torn from the book, while a line of weakness is also preferably provided to enable the originals to be torn loose from the duplicates 2.

In a triplicate book it will usually be preferable to make the originals 1 integral with the carbon sheets 3 and to make the sheets 5 integral with the carbon sheets 6. See Fig 5.

It will be evident that more than two copies of the original may be obtained by adding further duplicate and carbon sheets. It will also be evident that the essential feature of my invention, which is the substantially permanent securing of the carbon sheet behind the translucent duplicate sheet, may be embodied in forms and books of many different types other than those illustrated.

In books of the construction illustrated and described, it will usually be necessary to use a rest or stop card between the set of leaves being written upon and those beneath in order to prevent duplication on the set of leaves next beneath when the book is used from the front, or in case the book is used from the back, to prevent duplication on the leaves already written upon when the same are left in the book. In cases where a whole set of leaves is removed from the book after each writing and the book is worked from the back, there is no need of a rest being used. In Fig. 5 a rest 7 is indicated integral with the outer end of the book cover.

It will be seen that a book constructed in the manner described may be easily and quickly manipulated as the operator does not need to concern himself with the positioning of the carbon sheets. Manipulation is also facilitated in that the leaves of each set are not easily mixed or confused with the leaves of other sets. The book will be clean to handle, as at no time do the fingers of the user come into contact with the carbonized surfaces of the carbon sheets. As the duplicates have the transferred coating of the carbon sheets on their under sides, which are always covered by carbon sheets, the carbon copies cannot be smudged and cannot soil the fingers of those who may require to handle them after the sale has been made.

Another advantage of my construction is that it is more difficult to make alterations or erasures on the duplicate in such a manner as to avoid detection.

What I claim as my invention is:

1. In manifolding books, the combination of an orginal sheet folded on itself, the upper surface of the under part being carbonized and a duplicate sheet of translucent material secured over the coated surface so as to remain permanently in connection therewith.

2. In manifolding books, the combination of an original sheet folded on itself, the upper surface of the under part being carbonized; a duplicate sheet of translucent material secured over the coated surface so as to remain permanently in connection therewith; a second translucent sheet adapted to overlie the first and a carbon sheet coated on one side secured behind the translucent sheet with the coated side next said sheet, so as to turn with said sheet in the handling of the book.

3. In manifolding books, the combination with a plurality of original sheets of a plurality of duplicate sheets, one for each original, each duplicate comprising a base sheet carbonized on its upper face only and a sheet of thin paper secured over the carbonized face of the base sheet so as to permanently cover the same, the thin cover sheet being sufficiently translucent to show at its outer face records transferred to its back from the carbon coating of the base sheet.

4. A manifolding book comprising a plurality of manifold units, each unit comprising a stub by means of which it is bound in the book, a duplicate record sheet detachably connected to the stub, an original uncarbonized record sheet secured to the outer end of the duplicate sheet and normally folded in parallel relation thereover and a carbon sheet united to the back of one of said record sheets adjacent the juncture of said sheets and adapted to transfer an inscription written on the orginal record sheet to the duplicate record sheet and being detachable with the unit to which it is attached, upon detachment of the unit from the book, to maintain its normal manifolding position in the unit after the unit has been detached from the book.

5. A manifolding book comprising a plurality of manifold units detchably bound in the book by a part thereof, each unit comprising a duplicate record sheet; an original uncarbonized record sheet secured to the outer end of the duplicate sheet and normally folded in parallel relation thereover, and a carbon sheet united at one end to one of said record sheets adjacent its juncture with the other record sheet to transfer an inscription written on the original record sheet to the duplicate record sheet and detachable with the unit to which it is attached, upon detachment of the unit from the book, to maintain its normal manifolding position in the unit after the unit has been detached from the book.

6. A manifolding book comprising a plurality of manifold units detachably bound in the book by a part thereof, each unit comprising a duplicate record sheet; an original uncarbonized record sheet secured to the outer end of the duplicate sheet and normally folded in parallel relation thereover, and a carbon sheet united at each end to one of said record sheets so as to be substantially coterminous therewith and to transfer an inscription written on the original record sheet to the duplicate record sheet and detachable with the unit to which it is attached, upon detachment of the unit from the book, to maintain its normal manifolding position in the unit after the unit has been detached from the book.

Signed at Toronto, Canada, this 1st day of May, 1931.

LOUIS HUFFMAN.